United States Patent
Dahlman et al.

(10) Patent No.: US 10,999,177 B2
(45) Date of Patent: May 4, 2021

(54) METHOD AND A FIRST NODE FOR MANAGING MODES OF OPERATION OF A SERVICE

(71) Applicant: GUANGDONG OPPO MOBILE TELECOMMUNICATIONS CORP., LTD., Dongguan (CN)

(72) Inventors: Erik Dahlman, Stockholm (SE); Magnus Frodigh, Sollentuna (SE); Mikael Hook, Sollentuna (SE); Harald Kallin, Sollentuna (SE); Gunnar Mildh, Sollentuna (SE); Joachim Sachs, Sollentuna (SE)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/599,408

(22) Filed: Oct. 11, 2019

(65) Prior Publication Data
US 2020/0044951 A1    Feb. 6, 2020

Related U.S. Application Data

(63) Continuation of application No. 15/122,841, filed as application No. PCT/SE2014/050258 on Mar. 4, 2014, now Pat. No. 10,469,353.

(51) Int. Cl.
*H04L 12/26* (2006.01)
*H04W 4/70* (2018.01)
(Continued)

(52) U.S. Cl.
CPC .......... *H04L 43/10* (2013.01); *H04L 41/5009* (2013.01); *H04L 43/0811* (2013.01); *H04W 4/70* (2018.02); *H04W 24/04* (2013.01)

(58) Field of Classification Search
None
See application file for complete search history.

(56) References Cited

U.S. PATENT DOCUMENTS

2004/0214581 A1   10/2004   Davis et al.
2007/0239862 A1   10/2007   Bronez et al.
(Continued)

FOREIGN PATENT DOCUMENTS

GB          2466626 A        6/2010
WO     WO 2011149252 A2    12/2011

OTHER PUBLICATIONS

Kuklinski, Slawomir et aL, "Density Based Clustering Algorithm for VANETs", Testbeds and Research Infrastructures for the Development of Networks & Communities and Workshops, Tridentcom 2009, 5th International Conference ON, IEEE, Piscataway, NJ, USA, Apr. 6, 2009, pp. 1-6.
(Continued)

*Primary Examiner* — Zewdu A Beyen
(74) *Attorney, Agent, or Firm* — Hodgson Russ LLP

(57) ABSTRACT

A first node (110) and a method therein for managing modes of operation of a service, referred to as "service modes" are disclosed. The service is executed in the first node (110). The service is capable of communicating with a second node (120) over a wireless network (100). The first node (110) receives an estimated level of a connectivity for the service from the wireless network (100). The estimated level of the connectivity relates to likelihood of maintaining the connectivity to the second node (120). The first node (110) selects one of the service modes based on the estimated level of the connectivity. Moreover, corresponding computer programs and computer program products are disclosed.

20 Claims, 3 Drawing Sheets

(51) Int. Cl.
*H04W 24/04* (2009.01)
*H04L 12/24* (2006.01)

(56) References Cited

U.S. PATENT DOCUMENTS

| | | | |
|---|---|---|---|
| 2009/0161633 A1* | 6/2009 | Chen | H04M 1/2745 |
| | | | 370/335 |
| 2013/0265173 A1 | 10/2013 | Millar | |
| 2013/0288668 A1 | 10/2013 | Pragada | |
| 2014/0022932 A1 | 1/2014 | Park | |
| 2015/0119035 A1* | 4/2015 | Ganu | H04W 36/30 |
| | | | 455/436 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 11 )", 3GPP TS 36.331 V11. 7.0, Mar. 2014, 1-350.
3GPP, "3rd Generation Partnership Project; Technical Specification Group Services and System Aspects; Policy and charging control architecture (Release 11 )", 3GPP TS 23.203 V11.13.0, Mar. 2014, 1-182.

\* cited by examiner

METHOD AND A FIRST NODE FOR MANAGING MODES OF OPERATION OF A SERVICE

CROSS-REFERENCE TO RELATED APPLICATIONS

This application is a continuation of U.S. patent application Ser. No. 15/122,841, filed Aug. 31, 2016, which is a U.S. National Phase entry under 35 U.S.C. § 371 from PCT International Application No. PCT/SE2014/050258, filed Mar. 4, 2014, all of which are incorporated herein by reference.

TECHNICAL FIELD

Embodiments herein relate to wireless communication systems, such as telecommunication systems. A method and a first node for managing modes of operation of a service are disclosed. Moreover, a corresponding computer program and a computer program product are disclosed.

BACKGROUND

Today wireless communication systems are mainly used for human-centered communication and services. A trend is, however, to use wireless communication systems for communication and services mainly involving machines. This kind of communication and services are often referred to as Machine-to-Machine (M2M) communication.

Certain types of communication and services within M2M communication are expected to require that a wireless connection, provided by the wireless communication systems, is highly reliable. The wireless connection is required to be highly reliable both in terms of loss of the wireless connection and the possibility of establishing the wireless connection. In the following, the term "reliable" is used in this context. Therefore, for the above mentioned certain types of communication and services within M2M communication, a high reliability of the connection, or the possibility to establish connection, may be said to be required.

This kind of high reliability may also be required for Person-to-Machine (P2M), Person-to-Person (P2P) and Machine-to-Person (M2P) communication.

Services that may need this kind of high reliability include industrial process control services, services for alarm monitoring, services in smart grid applications, control and management of business and/or mission critical processes or services, services for monitoring critical infrastructure and services towards responders in the national security and public safety segment and other similar services.

Furthermore, high reliability for certain services may be beneficial where deployment of nodes, such as radio base station, radio network controller etc., is particularly costly. At the same time, it is desired to achieve sufficient capacity, e.g. in terms of number of connected devices, and/or coverage for the services.

Consider for example a device, such as smart meters for a smart grid, a metering, sensing or activation device, that is deployed in a network at a remote location at high cost. If there would be a failure in communication with such a device e.g. due to bad coverage and/or insufficient capacity, a manual restoration of the communication with the device or a replacement of the device with another device would be required to compensate for the failure. Such compensation may imply high labor costs, which would scale in an unacceptable manner when there are a great number of devices which often is the case in application of M2M communication.

It is known to provide connectivity for M2M devices in a number of different ways using e.g. wired or wireless connections. The wired connections may be copper wires, optical fibers, Ethernet cables or the like. The wireless connections may be provided by use of various Radio Access Technologies (RATs), such as Wi-Fi, Evolved Universal Terrestrial Radio Access Network for Long Term Evolution (EUTRAN/LTE), Universal Terrestrial Radio Access Network for High Speed Packet Access (UTRAN/HSPA), Global System for Mobile communication (GSM) for Enhanced Data GSM Environment (EDGE) Radio Access Network (GERAN) and the like. Moreover, evolutions of the aforementioned RATs as well as other Third Generation Partnership Project (3GPP) networks may be used to provide the wireless connection.

During planning of the radio access networks and/or telecommunication systems mentioned above, it is sometimes desired to set up the radio access network such as to provide a high reliability for M2M devices. High connectivity could then be provided in the following ways.

For example, the radio access network could be deployed as over-dimensioned in terms of transport and/or radio link resources. Over-dimensioning of transport resources may refer to use of optical fibers for communication from a base station, while a peak bit-rate from the base station is 800 Megabits per second and an optical fiber may handle tenth of Gigabits per second. Over-dimensioning of radio link resources refers to deployment of more base stations, antennas, use of more frequency bands, etc. than needed according to an estimated network load. The RAN is said to be over-dimensioned when it is deployed to be able to handle a worst case scenario while still having resources that are available for any upcoming communication.

As another example, so called node availability may be increased by introducing redundancy in a node by installing multiple power units for powering of the node. The node availability may relate to availability of e.g. transport nodes, radio nodes and server nodes, which communicate with the M2M device or control or support the network operation. Node availability decreases on failure of a node, which typically happens when power units for powering of the node breaks down.

As a further example, in some specific network segments, multiple paths could be introduced to avoid single point of failure. An optical fiber ring is able to cope with interruptions of one optical link by routing information in the opposite direction as compared to where the interrupted optical link is located.

A known exemplifying control system includes a controller and an electrical valve that is controlled by the controller. The controller sends reference values for controlling the opening and closing of the valve over a wireless connection. As an example, a reference value of zero means that the valve should be closed, a reference value of ten means that the valve should be completely open and a reference value of five means that the valve should be opened to midway and closed to midway. Hence, a service executing in the electrical valve receives reference values from the controller. In response thereto, the valve sends an actual value representing degree of openness of the valve. In case, the control system controls a flow of a fluid for cooling of e.g. a nuclear plant, it may have serious consequences if the valve is not controlled in an appropriate manner. Disadvantageously, a failure of the wireless connection may cause damage to both facilities and humans.

In order to reduce risks due to e.g. a failure of the wireless connection, the known control system may be operated in a safe manner at all times. The safe manner should not cause damages as described above, if there are large delays in the communication or even non existing communication between the controller and the electrical valve.

SUMMARY

An object may be to efficiently operate a service, e.g. requiring high reliability, in a wireless network. With reference to the example above, efficient operation of the service may improve security thereof.

According to a first aspect, the object is achieved by a method, performed by a first node, for managing modes of operation of a service, referred to as "service modes". The service is executed in the first node. The service is capable of communicating with a second node over a wireless network. The first node receives an estimated level of a connectivity for the service from the wireless network. The estimated level of the connectivity relates to likelihood of maintaining the connectivity to the second node. The first node selects one of the service modes based on the estimated level of the connectivity.

According to a second aspect, the object is achieved by a first node configured to manage modes of operation of a service, referred to as "service modes". The service is executable in the first node. The service is capable of communicating with a second node over a wireless network. The first node is configured to receive an estimated level of a connectivity for the service from the wireless network. The estimated level of the connectivity relates to likelihood of maintaining the connectivity to the second node. Furthermore, the first node is configured to select one of the service modes based on the estimated level of the connectivity.

According to a third aspect, the object is achieved by a computer program for managing modes of operation of a service. The computer program comprises computer readable code units which when executed on a first node causes the first node to perform the method in first node as described herein.

According to a fourth aspect, the object is achieved by a computer program product, comprising a computer readable medium and the computer program described directly above.

The first node receives the estimated level of the connectivity from the wireless network. In this manner, the first node is able to select its mode of operation based on the estimated level of the connectivity, e.g. the mode of operation may be adjusted to conditions in the wireless network. This may mean that the mode of operation is dependent on the estimated level of the connectivity. As an example, less requiring modes may be selected when the estimated level of the connectivity is considered low. Here, less requiring may be in terms of connectivity. As a result, the above mentioned object is achieved.

An advantage with some embodiments herein is that more efficient operation of the service is enabled when the estimated level of the connectivity is relatively high. Moreover, the embodiments herein also make it possible to switch to, or select, a less efficient, but more secure, mode of operation when the estimated level of the connectivity is low or normal.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
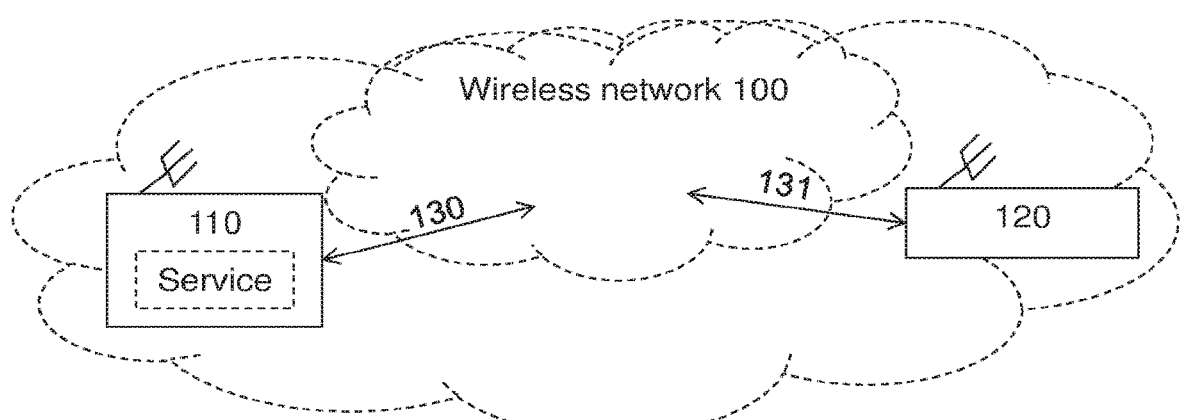
FIG. 1 is a schematic overview of an exemplifying wireless network in which embodiments herein may be implemented.

Throughout the following description similar reference numerals have been used to denote similar elements, units, modules, circuits, nodes, parts, items or features, when applicable. In the Figures, features that appear in some embodiments are indicated by dashed lines.

FIG. 1 depicts an exemplifying wireless network 100 in which embodiments herein may be implemented. In this example, the wireless network 100 is a Long Term Evolution (LTE) system. In other examples, the wireless network may be any cellular or wireless communication system, such as a Wideband Code Division Multiple Access (WCDMA) network, a Global System for Mobile communication (GSM network), Wireless Fidelity (Wi-Fi) or the like.

Furthermore, a first node 110 and a second node 120 are shown in FIG. 1. The wireless network 100 may comprise the first node 110 and/or the second node 120. In some examples, the first node 110 and the second node 120 are capable of communicating 130,131 with each other at least partly over the wireless network 100.

As used herein, the term "node" may refer to an evolved Node B (eNB), a control node controlling one or more Remote Radio Units (RRUs), a radio base station, an access point, a user equipment, a car with radio/wireless communication capabilities, a wireless machine-to-machine device or the like.

As used herein, the term "user equipment" may refer to a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, an embedded processor equipped with radio communication capabilities or connected to a modem, a sensor device equipped with radio communication capabilities or the like. The sensor may be any kind of weather sensor, such as wind, temperature, air pressure, humidity etc. As further examples, the sensor may be a light sensor, an electronic switch, a microphone, a loudspeaker, a camera sensor etc. The term "user" may refer to the user equipment.

Before the embodiments herein are described, level of connectivity, as a concept, is explained with reference to the block diagrams in FIG. 2 and FIG. 3. The first node 110 and/or the second node 120 may be referred to as a M2M device.

Level of connectivity may also be referred to as connectivity availability. Generally, the level of connectivity is herein defined as a probabilistically guaranteed promise that some sufficiently good connectivity, which e.g. fulfils service requirements for a specific M2M service, can be provided at or above some degree of likelihood. Service requirements are further described in section "service requirements" below. In some examples, the level of connectivity may be a value relating to likelihood of maintaining the connectivity towards the wireless network 100, such as the second node 120, for a service, such as the specific M2M service or the like.

Figure 2:
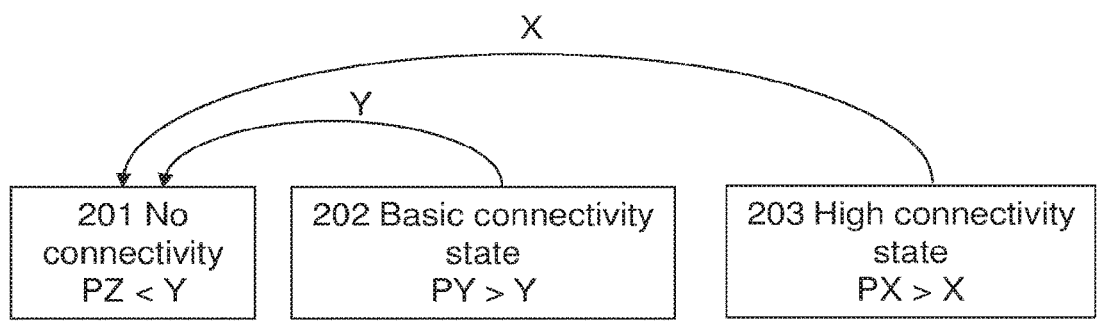
FIG. 2 is a block diagram illustrating states relating to level of connectivity.

FIG. 2 shows a block diagram illustrating three exemplifying states relating to levels of connectivity. The three exemplifying states includes a first state 201 with no connectivity, a second state 202 with basic level of connectivity and a third state 203 with high level of connectivity.

In this example, a level of connectivity is given by a probability value between 0 and 1. Therefore, the level of connectivity may be a digit, a value, a string of bits or the like, which is representing some specific level of connectivity. Thus, the level of connectivity relates to likelihood, or probability, for a service, executed in the first node 110, to maintain connectivity to the wireless network 100 and/or e.g. the second node 120.

To maintain the connectivity means that the first node 110 may maintain, i.e. not drop, a wireless connection that has been established.

Moreover, to maintain the connectivity means that the first node 110 may establish, or set up, a wireless connection successfully with likelihood given by the probability value. Since the connectivity applies to the service, expressed herein as connectivity for the service, service requirements for the service are accordingly fulfilled by the connectivity, e.g. the wireless connection, be it an already exiting connection or a connection to be set up.

With the concept of level of connectivity, a required level of the connectivity shall be distinguished from an estimated level of the connectivity.

The required level of the connectivity may be determined by the service, i.e. the service, or in fact a person providing or handling the service, may set the required level of the connectivity to a certain values, e.g. 0.9. For this reason, the required level of the connectivity may be referred to as a desired, or even required, level of the connectivity. As mentioned above, level of connectivity in general may be represented by values between 0 and 1. Thus, a value of 0.9 may be considered to represent a high level of connectivity. The required level of the connectivity may also be a default level of the connectivity. The default level of the connectivity may apply for a particular service or a group of services. In other examples, the required level of the connectivity may be represented by descriptors as "poor", "medium", "high" or the like, which descriptors in turn may be associated with certain ranges of the level of the connectivity.

The required level of the connectivity may, additionally or alternatively, be set by a network node, comprised in the wireless network 100. The network node may handle requests for services and/or connections therefore. As an example, the network node may be an eNB in LTE, a Radio Network Controller (RNC), Mobility Management Entity (MME), Serving General Packet Radio Service Support Node (SGSN), Policy and Charging Rules Function (PCRF), Home Subscriber Server (HSS), Home Location Register (HLR) or the like. When the network node sets the required level of the connectivity, it may set different levels of the connectivity for different services, different users, i.e. different nodes such as the first and second nodes 110, 120, different user groups, different types of devices and the like. The different users, or user groups, may be different in terms of subscriptions, home network etc. The different types of devices may be different in terms of being mobile or stationary, a user device or a machine device and the like.

The estimated level of the connectivity may for example be determined as described in section "Determining level of connectivity". The estimated level of the connectivity depends on radio conditions, traffic load etc. in the wireless network 100. Therefore, the estimated level of the connectivity reflects actual, or real, level of the connectivity for the service towards the wireless network. The estimated level may thus correspond to an actual, or current, level of the connectivity. As a consequence, when the estimated level is increased, or decreased, it means that the actual level of the connectivity, which the estimated level is an estimate of, is in fact increased, or decreased. The increase or decrease of the estimated level may occur due to that certain actions, e.g. relating to ensuring of the required level of the connectivity, as described herein are performed.

As described above, the level of the connectivity may be expressed as probability for a service to maintain connectivity to the wireless network 100. This means that the probability may be linked to a time period. Hence, as an example, the probability of losing the connectivity during an upcoming (future) time period is 0.9. In other examples, the probability may relate to that an event occurs. The event may e.g. be that a fire alarm report is in fact received by a probability of 0.9999 which would set a requirement that there is connectivity when the fire alarm actually goes off.

Furthermore, the level of the connectivity may be expressed as Mean Time Between Failures (MTBF). For example, when the MTBF of the connectivity is 100 years, failure is very rare.

The three exemplifying states relating to levels of the connectivity may be seen as a quantization of the levels of the connectivity.

In FIG. 2, threshold values X and Y for deciding when to consider the service to be in any one of the three states 201, 202, 203 relating to levels of the connectivity are indicated. Expressed differently, an exemplifying M2M device (not shown) may be in one of the three states depending on relations between an estimated probability value relating to the level of the connectivity and the threshold values X and Y. The M2M device may be an example of the first node 110 and/or the second node 120.

The estimated probability value may be given, e.g. indirectly or directly, by the estimated level of the connectivity. Hence, the estimated probability value may be given indirectly by the estimated level of the connectivity when the estimated level of the connectivity represents a probability. For example, when the estimated level of the connectivity is equal to 300, it represents e.g. a probability of 0.7. This means that the estimated level of the connectivity may need to be translated, interpreted or the like, before it can be used as a probability value. Alternatively, the estimated probability value may be given directly by the estimated level of the connectivity when the estimated level of the connectivity is e.g. equal to 0.7. In this case, the estimated level of the connectivity can be used directly without a need for translation, interpretation or the like, since probability values range from zero to one.

The three states are in this example defined as follow, starting with the third state 203 for ease of explanation. In order to find out in which state the service is the estimated probability value may be determined as mentioned above. Throughout this example, it is assumed that the same service requirements for the service apply in all states.

High Connectivity State

The M2M device may be in a so called high connectivity state aka the third state. The connectivity may be considered high if the estimated probability value, here denoted PX, is e.g. above a threshold X. While using the reference numerals in the Figure, we have that PX>X.

Basic Connectivity State

The M2M device may be in a so called basic connectivity state aka the second state. While assuming in this example that the estimated probability value is PY, the connectivity may be considered to be basic if PY is e.g. above a threshold Y. At the same time, PY is not high enough to reach the high connectivity state, i.e. the estimated probability value PY is less than the threshold X. While using the reference numerals in the Figure, we have that Y<PY<X.

No Connectivity

The M2M device may be in a state of no connectivity aka the first state. In this state, the M2M device has no connection to the network or a connection that does not fulfil the service requirements, and the M2M device has therefore no service. Furthermore, the M2M device may not have, as far as it can be estimated, any possibility to obtain a connection. This means that the estimated probability value, now denoted by PZ, is not high enough to reach the basic connectivity state. As an example, the M2M device may be out-of-coverage in view of the wireless network 100. While using the reference numerals in the Figure, we have that PZ<Y.

In the description above, the M2M device is said to be in the different states mentioned above for reasons of simplicity. In some examples, in case a M2M device runs multiple services, each of those multiple services may be said to be in the different states. Some or all of the multiple services may be in the same state or all of the multiple services may be in a respective state.

In the following description, two example scenarios will be referred to in order to improve understanding.

In a first exemplifying scenario, the wireless network 100 is included in, or forms a part of, a traffic control system, which includes various entities, e.g. traffic lights, vehicle such as car and trucks, bicyclists carrying cellular phones. At least some of the entities communicate over the wireless network 100. This means that some entities of the traffic control system may be within the wireless network 100 and some other entities may be outside the wireless network 100.

As an example, some functions related to control of vehicles etc. can be automated when the high connectivity state is reached or available, but these functions need to operate in a half-automatic or manual mode for safety reasons when only basic connectivity state is reached or available.

In a second exemplifying scenario, the wireless network 100 is included in an industrial control system or power system. The industrial control system may comprise various entities, such as valves, transportation belts, spray devices for painting or physical/chemical treatment etc. At least some of the entities communicate over the wireless network 100. This means that some entities of the industrial control system may be within the wireless network 100 and some other entities may be outside the wireless network 100.

The industrial control system may operate at lower margins with higher efficiency, e.g. higher yield, when the entities communicating over the wireless network 100 have high connectivity state, e.g. with bounded latency, compared to when the entities only have basic connectivity state, which would require higher margins since the industrial control system needs e.g. more time to react, treat, open/close valves etc.

In the second scenario, it may be that the industrial control system is operated based on local information, or half-automatic mode, when the entities communication over the wireless network 100 have low connectivity state. Local information may have been stored in the entities prior to the low connectivity state.

Figure 3:
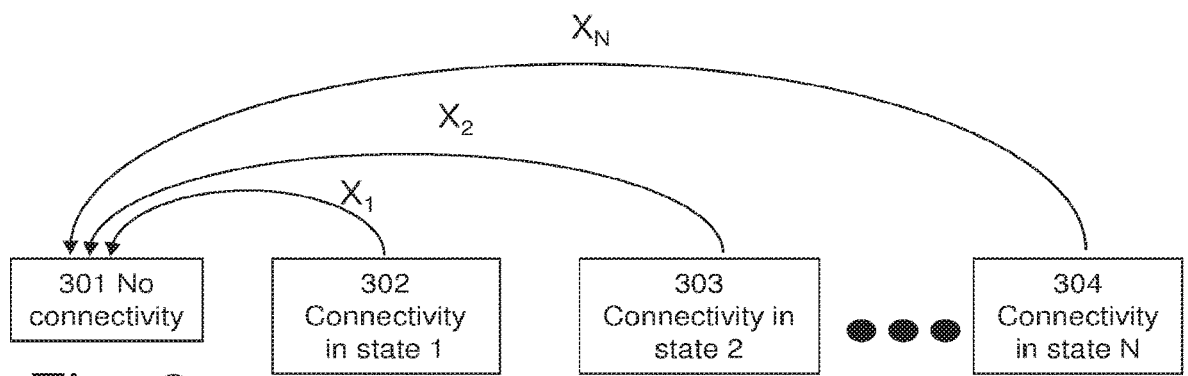
FIG. 3 is another block diagram illustrating states relating to level of connectivity.

In FIG. 3, another block diagram illustrates a more general case with N number of states relating to level of connectivity. As illustrated in this Figure, the states shown in FIG. 2 may be extended to include additional states with different levels of connectivity, e.g. with different transition probabilities X1 . . . XN for transition from one state to another.

Figure 4:
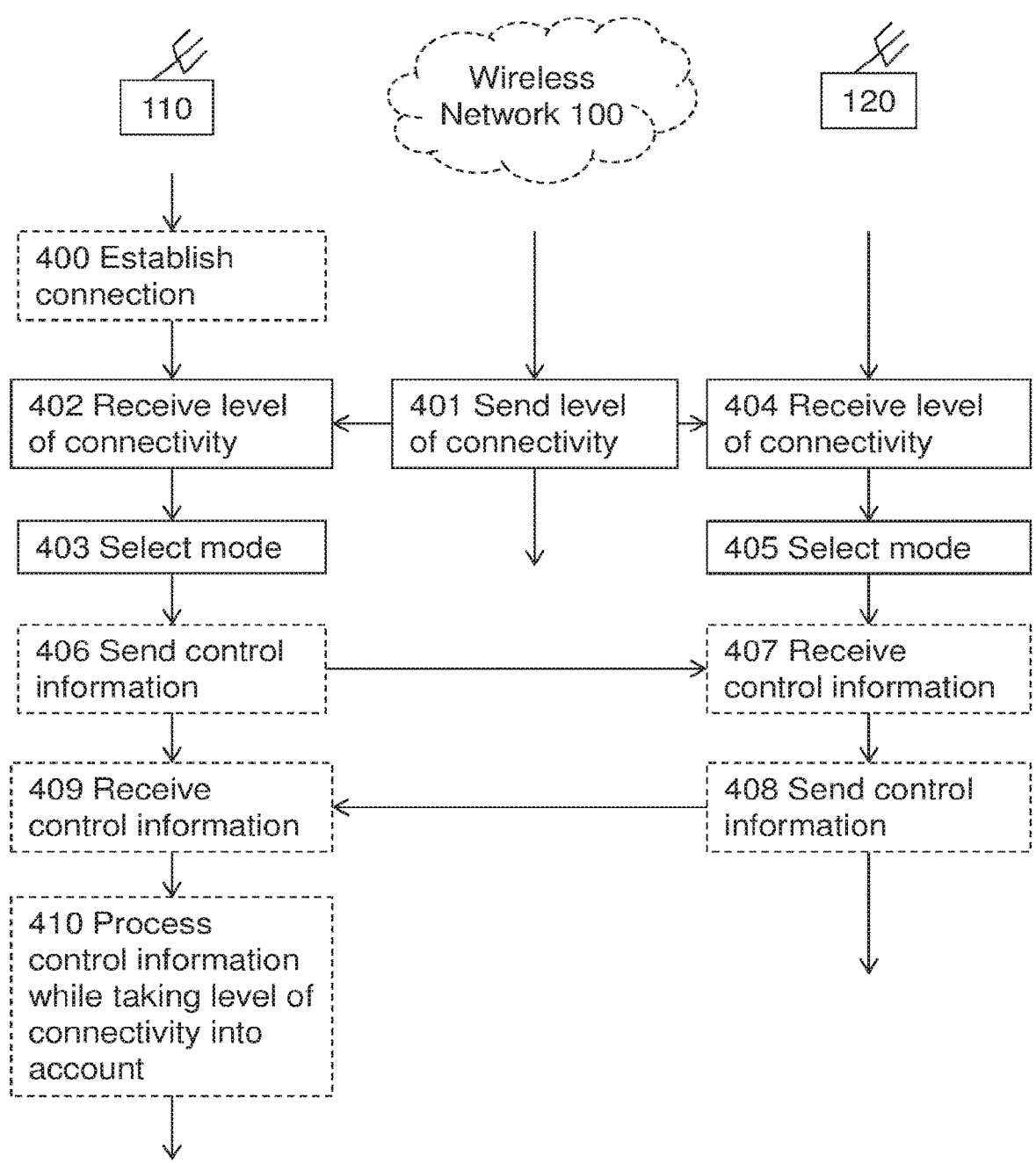
FIG. 4 is a schematic, combined signaling scheme and flowchart illustrating embodiments of the methods.

FIG. 4 illustrates an exemplifying method for managing modes of operation of a service when performed in connection with the wireless network 100 of FIG. 1. The modes of operation of the service will in the following be referred to as "service modes". The service is executed in the first node 110. Therefore, the service is capable of communicating with the second node 120 over the wireless network 100.

According to some embodiments, referred to as "peer embodiments" herein, the first node 110 and the second node 120 may be peer entities of a system. The system may include a first robot and a second robot, as examples of the first node 110 and the second node 120, respectively, in a manufacturing plant or automated warehouse. The term "peer entities" means that none of the first and second nodes 110, 120 controls the other node, or is a master over the other node.

According to some other embodiments, referred to as "controller embodiments" herein, the first node 110 may be a server, a master device, a controller device or the like. This means that the first node 110 is in a superior position in relation to the second node 120. In the second embodiments, the service may thus be capable of communicating 130, 131 with the second node 120 in that the service controls the second node 120 via a control loop over the wireless network 100. Typically, the first node 110 may send control information for controlling the second node 120 as in action 406 below.

According to yet some other embodiments, referred to as "slave embodiments" herein, the first node 110 may be a client device, a slave device or the like. This means that the first node 110 is in an inferior position in relation to the second node 120. The service may thus be capable of communicating 130, 131 with the second node 120 in that the service may be controllable by the second node 120 via a control loop over the wireless network 100. As an example, the second node 120 controls the first node 110 e.g. by sending control information as in action 408 below.

In some scenarios, when the first and second nodes 110, 120 are comprised in the wireless network, connectivity between the first and second nodes 110, 120 may be entirely managed by the wireless network 100. The connectivity may be realized by means of a wireless end-to-end (e2e) connection. In these scenarios, the e2e connection may be managed within an operator's network, where the operator e.g. owns or operates the wireless network 100. This means that the required level of connectivity may be managed from service/application layers, such as the service itself.

Initially, the first node 110 and second node 120 may have been registered with each other or a further node (not shown). In this manner, the first and second nodes 110, 120 may have been set up for communication while using at least in part the wireless network 100.

The following actions may be performed in any suitable order

Action 400

The first node 110 may establish a connection with the second node 120 over the wireless network 100.

Action 401

In order for the wireless network 100 to be able to inform e.g. the first and/or second nodes 110, 120 about a level of connectivity for the service, the wireless network 100 may determine, or measure, the estimated level of the connectivity.

The estimated level of the connectivity may have been determined by the wireless network 100 based on conditions relating to the connection. The conditions relating to the connection may include at least one of:

number of connections for the first node 110;
quality of connections for the first node 110;
variance of quality of connections for the first node 110;
correlation between connections for the first node 110; and
network conditions impacting connections for the first node 110.

This is further elaborated below with reference to section "Determining level of connectivity". Accordingly, the estimated level of the connectivity may be an actual level of connectivity that as mentioned e.g. depends on traffic load, radio conditions etc. in the wireless network 100.

Then, the wireless network 100 sends the estimated level of the connectivity for the service to the first and/or second node 110, 120. The estimated level of the connectivity relates to likelihood of maintaining the connectivity to the second node 120.

In some further examples, the first node 110 may estimate the estimated level of the connectivity.

Determining Level of Connectivity

As mentioned, the wireless network 100 may determine the level of the connectivity based on one or more conditions relating to at least one connection for the first node 110, the second node 120 and/or the service. In the following the term "M2M device" will be used to refer to the first node 110, the second node 120 and/or the service.

The expression "a connection for the M2M device" refers to that a connection is usable by the M2M device.

The connection that is useable by the first node 110 shall be understood to mean a connection which the M2M device is capable of using or which the M2M device already uses. The connection that the M2M device is capable of using may be called a potential or possible connection. Thus, the potential connection for the M2M device is not yet established, i.e. the M2M device is not attached to the wireless network 100 by means of such potential connection.

An already used connection does not necessarily mean that the connection is actively used for transmission of data. Instead, it is enough that the already used connection is established between the first node 110 and e.g. the second node 120. For LTE, this means that the first node 110 can be in either so called idle mode or connected mode, which modes are referred to as RRC_IDLE and RRC_CONNECTED in Technical Specification (TS) 36.331 of the 3GPP group.

In the following examples, criteria for when to consider the level of connectivity to be high are given.

As a first example, the conditions relating to the at least one connection for the M2M device include, as mentioned, the number of connections for the M2M device.

At least U number of possible connections, which sometimes may be called connectivity links or paths, may be provided to the M2M device at a sufficiently good link quality.

Possible connections may be:
connections of the same radio technology, e.g. same or different frequency carriers, but e.g. to different base stations,
connections of the same radio technology to the same base stations but at different frequencies,
connections provided via different radio technologies, e.g. to the same or different base stations,
connections that provide connectivity to different access networks/operators,
fixed/wired connections, such as copper wires and the like.

Base station may here refer to radio network nodes, access points, relay nodes, repeaters and the like.

For the case above, the different connections can either be established simultaneously to the device or in case only some of the connections are established it is predicted, based e.g. on measurements, that it would be possible to establish the alternative connections in case the first set of connections are deemed lost.

As a second example, the conditions relating to the at least one connection for the M2M device include, as mentioned, the quality of connections for the M2M device.

The connections of the M2M device may be provided at a desired QoS level with a significant so called link margin.

For example, when the required transmit power of the M2M device is consistently X dB below the permitted power as determined by the wireless network 100 e.g. depending on interference restrictions.

As other example, the required radio resources for a connection are consistently Y % less than what is allocated, or available, for a connection. In detail, this may be that only half, i.e. Y=50%, of the bit rate specified for the connection, i.e. a Guaranteed Bit Rate (GBR) bearer, is used.

As a third example, the conditions relating to the at least one connection for the M2M device include, as mentioned, the variance of quality of connections for the M2M device. When the variance of quality of connections is below Z for all or at least S number of connections, then the level of connectivity may be considered high, assuming the average quality of the connections is considered good as is explained in the example below.

An example of quality of connections is connection margin, or link margin. Now assume that the M2M device has a certain level of connectivity, e.g. there are two connections available with at least 10 dB margin beyond what is needed for the required quality of service. The certain level of connectivity may be considered as a fulfilling the high connectivity state requirement if the margin has been stable over a time period. E.g. the margin was at least 10 dB during 95% of the time during the last 180 days, and variance of the margin was below a threshold Z.

At the same time, another M2M device with the same certain level of connectivity may be considered as not fulfilling the high connectivity state requirement for this other M2M device. As reason for this may be that in order to consider the other M2M device to fulfill the high connectivity state requirement, it may be required that the margin is very stable, i.e. variance of the margin should be less than P, where P=0.7*Z as an example. This means that P<Z.

In these manners, the estimated level of the connectivity for the M2M device is taking time dynamics of the quality of connections into account.

As a fourth example, the conditions relating to the at least one connection for the M2M device include, as mentioned, the correlation between connections for the M2M device. When the correlation of connections is below U for all or at least T number of connections, then the level of connectivity may be considered high.

As an example, connections which have many common elements or properties are considered to have high correlation, while connections which have different elements or properties have low correlation. Examples of elements include nodes, transport links, antennas, hardware configuration and the like. Examples of properties include radio frequency band, radio access technology or the like.

As a further example, assume a first path has a set of nodes x1 and links y1 and networks z1 to pass through, and a second path has accordingly x2/y2/z2 nodes/links/networks. A failure correlation, e.g. given as a value between 0 for no correlation and 1 for full correlation is determined e.g. by the M2M device. This can e.g. be done by determining how many of the x1/y1/z1 are common with x2/y2/z2. In this correlation also characteristics of the different elements in x/y/z may be considered. E.g. if the first and second paths share a common backhaul link, this link is determined to affect the correlation largely; at the same time, if the first and second paths share a common optical fiber transport link between two cities, this transport link may be considered as not affecting the correlation strongly, if it is determined that this link has a low probability of failure or a technical fallback mechanism in-build. Essentially this means that different nodes and links are assigned different weights depending on the individual reliability of the node and link when determining the overall failure correlation.

As a fifth example, the conditions relating to the at least one connection for the M2M device include, as mentioned, the network conditions impacting connections for the M2M device. The network conditions may be network load, radio interference, radio obstructions etc. The network load may refer to traffic generated from other users in a local area of the M2M device, number of active users etc. The radio interference may relate to harmful radio transmission received from other users, which decreases signal quality received at the M2M device. The radio obstructions may be if a user is in or behind a house which leads to weaker radio signals.

In further examples, the conditions relating to the at least one connection for the M2M device may include information about the mobility, e.g. stationary, limited movement, fully mobile, and capabilities of the M2M device, e.g. supported radio access, supported frequency bands, processing capabilities, power classes, etc.

Action 402

Thanks to that the wireless network 100 performs action 401, the first node 110 receives the estimated level of the connectivity from the wireless network 100. In this manner, the first node 110 is informed about the estimated level of the connectivity such that the first node 110 is able to use the estimated level of the connectivity in action 403 below.

Action 403

The first node 110 selects one of the service modes based on the estimated level of the connectivity. As an example, the first node 110 may select a service mode that is proportional to the estimated level of the connectivity when the service mode is represented by a number, or digit. Higher numbers may correspond to that higher levels of the connectivity are required for the service to be executed with high reliability, e.g. in a secure manner or fail safe manner. A high level of the connectivity typically means that there is a high probability, e.g. above a threshold value such as 0.9 corresponding to 90% probability, that the connectivity will be maintained.

In some embodiments, the service modes may comprise at least two modes of operation. Thus, the service modes may comprise a first service mode and a second service mode.

In these embodiments, the first node 110 may select the first service mode when the estimated level of the connectivity exceeds a first value of connectivity for allowing the service to be operated in the first service mode. The first value may be specified in a standard, pre-configured by end user/operator, and signaled dynamically e.g. when the first node registers to the wireless network 100. Alternatively, the first node may select the second service mode when the estimated level of the connectivity exceeds a second value of connectivity for allowing the service to be operated in the second service mode.

As an example, a control system may comprise the first and second nodes 110, 120. In this example, the service may be said to be allowed to be operated in the first or second service mode when the control system is stable. Stable, or stability, has its conventional meaning when used in connection with automatic control engineering, i.e. the control system may not easily be set into a state where control signals, as e.g. sent in action 406 below, oscillate or are outdated such that the control system ceases to work as intended.

Furthermore, in some embodiments, the first node 110 may select one of the service modes based on the estimated level of the connectivity in relation to the required level of the connectivity for a current service mode. For example, if the estimated level of the connectivity exceeds the required level of the connectivity for the current service mode, then the first node 110 may select another service mode for which the required level of the connectivity is greater than the required level of the connectivity for the current service mode.

Returning to the example above with the first and second service modes, it shall be noted that the required level of the connectivity is exemplified by the first and second values of connectivity for allowing the service to be operated in the first and second service modes, respectively.

Action 404

Thanks to that the wireless network 100 performs action 401, the second node 120 receives the estimated level of the connectivity from the wireless network 100. In this manner, the second node 120 is informed about the estimated level of the connectivity such that the second node 120 is able to use the estimated level of the connectivity in action 405 below.

Action 405

The second node 120 selects one of the service modes based on the estimated level of the connectivity. This action may be explained similarly to action 403 while describing the action from the second node's 120 view point instead of the first node's 110 view point.

Action 406

For example in the controller embodiments, the first node 110 may send control information, referred to as control signals in action 403 above, to the second node 120. Now further extending the example with the control system in action 403, control information may be sent to the second node 120 in response to feedback information about an actual value in relation to a reference value. As an example, the control system may control a heater to maintain a reference temperature. Then, the control information may include information about at which power the heater should be operated in order to make the actual temperature approach, and preferably maintain, the reference temperature.

Before the first node 110 sends the control information, the control information may be adapted to the estimated level of the connectivity. As an example, first node 110 may, e.g. depending on the service mode selected in action 403, adapt the control information in different manners. Returning to the example with the control system in action 403, a first margin value or the like may be applied to the control information in order to e.g. avoid frequent on/off operations of e.g. a valve. In this action, the first margin value may be increased as the estimated level of the connectivity decreases and the first margin value may be decreased as the estimated level of the connectivity increases.

Action 407

For example in the controller embodiments, the second node 120 may receive control information from the second node 120.

For the control system mentioned above, the second node 120 may perform some action according to the control information. Then, the second node 120 may send (not shown) feedback information to the first node 110. For a typical control system, the feedback information may include a deviation, or error, in relation to a reference value included in the control information.

Action 408

The second node 120 may send, to the first node 110, control information. The control information may be adapted to the estimated level of the connectivity. This action may be explained similarly to action 406 while describing the action from the second node's 120 view point instead of the first node's 110 view point.

Action 409

For example in the slave embodiments, the first node 110 may receive control information from the second node 120. Thanks to that the control information is received, the first node 110 may use the control information in action 410 below.

Action 410

Following action 409, the first node 110 may process the control information while taking the estimated level of the connectivity into account. As an example, first node 110 may, depending on the service mode selected in action 403, treat the control information in different manners. Returning to the example with the control system in action 403, a second margin value or the like may be used with the control information in order to e.g. avoid frequent on/off operations of e.g. a valve. In this action, the second margin value may be increased as the estimated level of the connectivity decreases and the second margin value may be decreased as the estimated level of the connectivity increases.

As mentioned above, the embodiments herein may be implemented in control systems. Let consider an exemplifying control system, which may be operated in multiple modes of operation, e.g. the service mode mentioned above. The control system comprises control elements, such as the first and/or second nodes. The control elements are at least partly connected over the wireless network 100.

The entire control system may be operated in one and the same mode of operation, or one or more nodes, such as the first and second nodes 110, 120 of the control system are individually, and independently from each other, operated in different modes of operation. As explained above, which of the different modes of operation that is selected, by e.g. the first node 110, depends to a certain extent on the estimated level of the connectivity.

As an example, the following modes may be selected according to various conditions.

A mode A: stability of the control system requires that the estimated level of the connectivity is above A, e.g. a certain probability, between at least two control elements of the control system.

A mode B: stability of the control system requires that the estimated level of the connectivity is above B between at least two control elements of the control system.

A mode C: stability of the control system requires that basic connectivity state is achieved between at least two control elements of the control system.

A mode D: the control system is operated without any connectivity over the wireless network 100. That is to say, no control information may be sent between the control elements of the control system.

In this exemplifying control system an overall efficiency or benefit of the control system decreases from mode A to subsequent modes, where mode D is the least efficient and/or least beneficial. Hence, connectivity of level A>connectivity of level B>threshold for basic connectivity state>threshold for no connectivity.

The control system receives, as in e.g. action 402 and 404, information about the estimated level of the connectivity, from the wireless network 100. The information indicates which level of the connectivity is provided between e.g. the control elements. Based on the estimated level of the connectivity, the mode of operation is selected such that the highest efficiency/benefit can be achieved while still fulfilling the estimated level of the connectivity requirements of the selected mode of operation.

In other examples, the mode of operation may be bound to a set of connectivity levels. Assume that the exemplifying control system comprises a first set of nodes, such as the first and second nodes 110, 120 and two further nodes (not shown). Then, a certain mode of operation of the exemplifying control system may be selected when the estimated level of the connectivity between the first and second nodes 110, 120 is equal to or above C, and the estimated level of the connectivity between the two further nodes is equal to or above B. Hence, which mode to select depends on the set of connectivity levels for different connections, potential or established, within the control system.

Service Requirements

In a wireless communication system like LTE, the service requirements may be defined by a set of parameters relating to Quality of Service (QoS). In 3GPP Technical Specification (TS) 23.203, a set of QoS Class Indicators (QCI) are described. The service that is set up is thus associated with a certain QCI, in e.g. a range from 1 to 9. Each QCI describes for example acceptable delay and error rate for the associated service.

Service requirements are also defined for GSM, UTRAN and the like.

Figure 5:
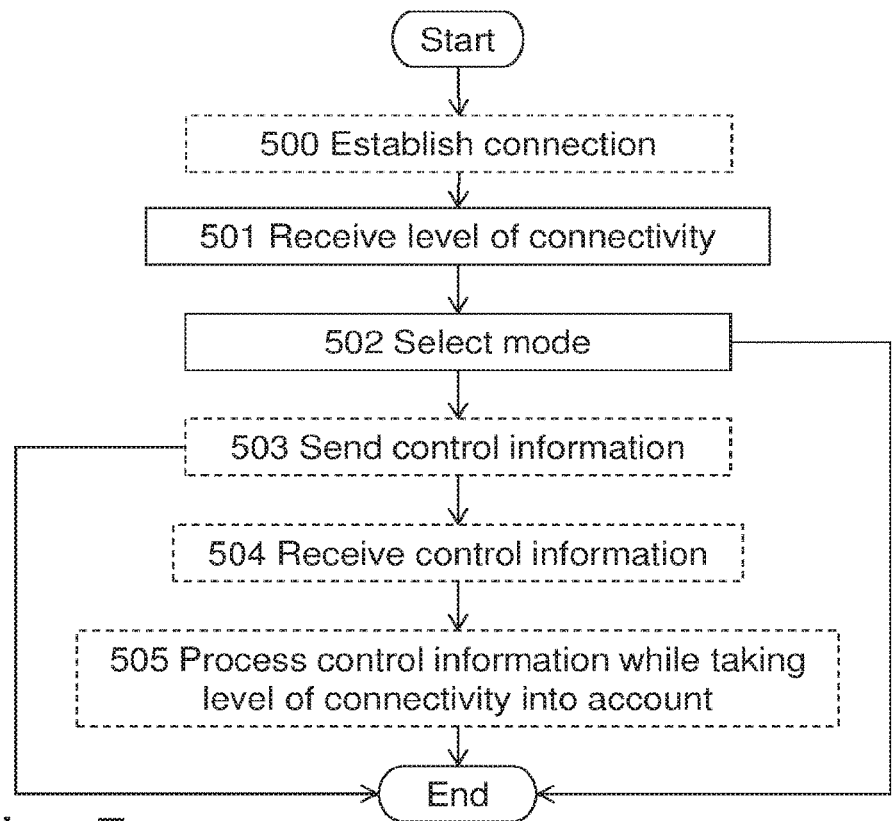
FIG. 5 is a flowchart illustrating embodiments of the method in the first node.

In FIG. 5, an exemplifying, schematic flowchart of the method in the first node 110 is shown. As mentioned, the first node 110 performs a method for managing modes of operation of a service, referred to as "service modes". The service is executed in the first node 110. The service is capable of communicating with a second node 120 over a wireless network 100.

As mentioned, the service may be capable of communicating while using a wireless end-to-end connection to and/or from at least one of the first node 110 and the second node 120. The wireless end-to-end connection may be managed by the wireless network 100.

The first node 110 may be a wireless machine-to-machine device. The first node 110 may be comprised in the wireless network 100. The second node 120 may be comprised in the wireless network 100.

The following action may be performed in any suitable order.

Action 500

The first node 110 may establish a connection with the second node 120 over the wireless network 100. This action is similar to action 400.

Action 501

The first node 110 receives an estimated level of the connectivity for the service from the wireless network 100. The estimated level of the connectivity relates to likelihood of maintaining the connectivity to the second node 120.

The estimated level of the connectivity may have been determined by the wireless network 100 based on conditions relating to the connection, wherein the conditions relating to the connection include at least one of:
number of connections for the first node 110;
quality of connections for the first node 110;
variance of quality of connections for the first node 110;
correlation between connections for the first node 110; and
network conditions impacting connections for the first node 110.

This action is similar to action 402.

Action 502

The first node 110 selects one of the service modes based on the estimated level of the connectivity.

In some embodiments, the service modes may comprise a first service mode and a second service mode. In these embodiments, the selecting of one of the service modes may comprise selecting the first service mode when the estimated level of the connectivity exceeds a first value of connectivity for allowing the service to be operated in the first service mode, or selecting the second service mode when the estimated level of the connectivity exceeds a second value of connectivity for allowing the service to be operated in the second service mode.

This action is similar to action 403.

Action 503

This action may relate to the controller embodiments, in which the service may be capable of communicating with the second node 120 in that the service controls the second node 120 via a control loop over the wireless network 100.

Therefore, the first node 110 may send, to the second node 120, control information. The control information may be adapted to the estimated level of the connectivity.

Since this action is similar to action 406, the description of action 406 applies also here.

Action 504

This action may relate to the slave embodiments, in which the service may be capable of communicating in that the service may be controllable by the second node 120 via a control loop over the wireless network 100.

Therefore, the first node 110 may receive, from the second node 120, control information.

Since this action is similar to action 409, the description of action 409 applies also here.

Action 505

The first node 110 may process the control information while taking the estimated level of the connectivity into account. This action may be similar to action 410.

Figure 6:
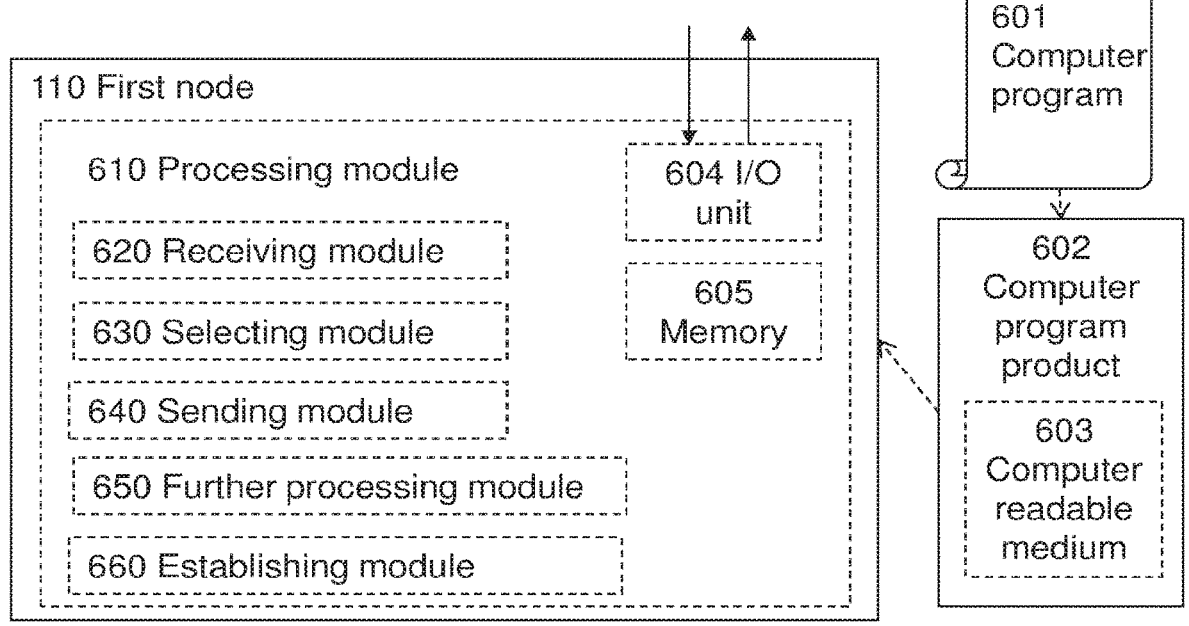
FIG. 6 is a block diagram illustrating embodiments of the first node.

With reference to FIG. 6, a schematic block diagram of the first node 110 is shown. The first node 110 is configured to perform the methods in FIGS. 4 and/or 5. Thus, the first node 110 is configured to manage modes of operation of a service, referred to as "service modes". The service is executable in the first node 110. The service is capable of communicating with a second node 120 over a wireless network 100.

As mentioned, the first node 110 may be a wireless machine-to-machine, M2M, device.

The first node 110 may be comprised in the wireless network 100. The second node 120 may be comprised in the wireless network 100.

Again, the service may be capable of communicating while using a wireless end-to-end connection to and/or from at least one of the first node 110 and the second node 120. The wireless end-to-end connection may be managed by the wireless network 100.

According to some embodiments herein, the first node 110 may comprise a processing module 610. In further embodiments, the processing module 610 may comprise one or more of a receiving module 620, a selecting module 630, a sending module 640, a further processing module 650 and an establishing module 660 as described below.

The first node 110, the processing module 610 or the receiving module 620 is configured to receive an estimated level of a connectivity for the service from the wireless network 100. The estimated level of the connectivity relates to likelihood of maintaining the connectivity to the second node 120.

The estimated level of the connectivity may have been determined by the wireless network 100 based on conditions relating to the connection, wherein the conditions relating to the connection may include at least one of:
number of connections for the first node 110;
quality of connections for the first node 110;
variance of quality of connections for the first node 110;
correlation between connections for the first node 110; and network conditions impacting connections for the first node 110.

Furthermore, the first node 110, the processing module 610 or the selecting module 630 is configured to select one of the service modes based on the estimated level of the connectivity.

Moreover, the first node 110, the processing module 610 or the establishing module 660 may be configured to establish a connection with the second node 120 over the wireless network 100.

In some embodiments, the service modes may comprise a first service mode and a second service mode. In these embodiments, the first node 110, the processing module 610 or the selecting module 630 may be configured to select the first service mode when the estimated level of the connectivity exceeds a first value of connectivity for allowing the service to be operated in the first service mode, or to select the second service mode when the estimated level of the connectivity exceeds a second value of connectivity for allowing the service to be operated in the second service mode.

The service may be capable of communicating in that the service may be configured to control the second node 120 via a control loop over the wireless network 100. The first node 110, the processing module 610 or the sending module 640 may be configured to send, to the second node 120, control information. The control information may be adapted to the estimated level of the connectivity.

The service may be capable of communicating in that the service may be controllable by the second node 120 via a control loop over the wireless network 100. The first node 110, the processing module 610 or the receiving module 620 may be configured to receive, from the second node 120, control information. Moreover, the first node 110, the processing module 610, the further processing module 650 may be configured to process the control information while taking the estimated level of the connectivity into account.

The first node 110 may further comprise an Input/output (I/O) unit 604 configured to send and/or receive the estimated level of the connectivity, the control information and other messages, values, indications and the like as described herein. The I/O unit 604 may comprise the receiving module 620, the sending module 640, a transmitter and/or a receiver.

Furthermore, the first node 110 may comprise a memory 605 for storing software to be executed by, for example, the processing module when the processing module is implemented as a hardware module comprising at least one processor or the like.

FIG. 6 also illustrates software in the form of a computer program 601 for managing modes of operation of a service. The computer program 601 comprises computer readable code units which when executed on the first node 110 causes the first node 110 to perform the method according to FIGS. 4 and/or 5.

Finally, FIG. 6 illustrates a computer program product 602, comprising computer readable medium 603 and the computer program 601 as described directly above stored on the computer readable medium 603.

As used herein, the term "processing module" may refer to a processing circuit, a processing unit, a processor, an Application Specific integrated Circuit (ASIC), a Field-Programmable Gate Array (FPGA) or the like. As an example, a processor, an ASIC, an FPGA or the like may comprise one or more processor kernels. In some examples, the processing module may be embodied by a software module or hardware module. Any such module may be a determining means, estimating means, capturing means, associating means, comparing means, identification means, selecting means, receiving means, transmitting means or the like as disclosed herein. As an example, the expression "means" may be a module, such as a determining module, selecting module, etc.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method performed by a first node, the method comprising:
   receiving, from a wireless network, an estimated level of connectivity for a service executed in the first node, wherein:
      the service communicates with a second node over the wireless network, and
      the estimated level of connectivity relates to a likelihood of maintaining connectivity of the first node to the second node over the wireless network;
   selecting a service mode based on the estimated level of connectivity;
   determining first control information of the service based on the selected service mode; and
   sending the first control information to the second node;
   wherein the first control information comprises connection margin, and the method further comprises:
      increasing the connection margin when the estimated level of connectivity decreases; and
      decreasing the connection margin when the estimated level of connectivity increases.

2. The method according to claim 1, wherein the selected service mode is an operation mode of the service over the wireless network.

3. The method according to claim 1, wherein selecting the service mode comprises:
   selecting a first service mode when the estimated level of connectivity exceeds a first value of connectivity for allowing the service to be operated in the first service mode, or
   selecting a second service mode when the estimated level of connectivity exceeds a second value of connectivity for allowing the service to be operated in the second service mode.

4. The method according to claim 1, wherein the service mode is selected from an automatic service mode, a half-automatic service mode, and a manual service mode.

5. The method according to claim 1, further comprising:
   receiving second control information of the service from the second node; and
   executing the service according to the second control information and the estimated level of connectivity.

6. The method according to claim 1, further comprising:
   establishing a connection with the second node over the wireless network.

7. The method according to claim 6, wherein the estimated level of connectivity is determined based on at least one of:
   a number of connections for the first node;
   quality of connections for the first node;
   a variance of quality of connections for the first node;
   a correlation between connections for the first node; and
   a network condition impacting connections for the first node.

8. The method according to claim 1, wherein the first node is a wireless machine-to-machine device.

9. The method according to claim 1, wherein the service communicates with the second node by using a wireless end-to-end connection managed by the wireless network.

10. A first node, comprising:
a memory storing instructions; and
a processor configured to execute the instructions to:
receive, from a wireless network, an estimated level of connectivity for a service executed in the first node, wherein:
the service communicates with a second node over the wireless network, and
the estimated level of connectivity relates to a likelihood of maintaining connectivity of the first node to the second node over the wireless network;
select a service mode based on the estimated level of connectivity;
determine first control information of the service based on the selected service mode; and
send the first control information to the second node;
wherein the first control information comprises connection margin, and the processor is further configured to execute the instructions to:
increase the connection margin when the estimated level of connectivity decreases; and
decrease the connection margin when the estimated level of connectivity increases.

11. The first node according to claim 10, wherein the selected service mode is an operation mode of the service over the wireless network.

12. The first node according to claim 10, wherein the processor is further configured to execute the instructions to:
select a first service mode when the estimated level of connectivity exceeds a first value of connectivity for allowing the service to be operated in the first service mode, or
select a second service mode when the estimated level of connectivity exceeds a second value of connectivity for allowing the service to be operated in the second service mode.

13. The first node according to claim 10, wherein the service mode is selected from an automatic service mode, a half-automatic service mode, and a manual service mode.

14. The first node according to claim 10, wherein the processor is further configured to execute the instructions to:
receive second control information of the service from the second node; and
execute the service according to the second control information and the estimated level of connectivity.

15. The first node according to claim 10, wherein the processor is further configured to execute the instructions to:
establish a connection with the second node over the wireless network.

16. The first node according to claim 15, wherein the estimated level of connectivity is determined based on at least one of:
a number of connections for the first node;
quality of connections for the first node;
a variance of quality of connections for the first node;
a correlation between connections for the first node; and
network conditions impacting connections for the first node.

17. The first node according to claim 10, wherein the first node is a wireless machine-to-machine device.

18. The first node according to claim 10, wherein the service communicates with the second node by using a wireless end-to-end connection managed by the wireless network.

19. A non-transitory computer readable storage medium storing a computer program, when executed by at least one processor of a first node, causing the first node to:
receive, from a wireless network, an estimated level of connectivity for a service executed in the first node, wherein:
the service communicates with a second node over the wireless network, and
the estimated level of connectivity relates to a likelihood of maintaining connectivity of the first node to the second node over the wireless network;
select a service mode based on the estimated level of connectivity;
determine first control information of the service based on the selected service mode; and
send the first control information to the second node;
wherein the first control information comprises connection margin, and the first node is further configured to:
increase the connection margin when the estimated level of connectivity decreases; and
decrease the connection margin when the estimated level of connectivity increases.

20. The non-transitory computer readable storage medium according to claim 19, wherein the selected service mode is an operation mode of the service over the wireless network.

* * * * *